US012241264B2

(12) United States Patent
Miks et al.

(10) Patent No.: US 12,241,264 B2
(45) Date of Patent: Mar. 4, 2025

(54) POUR IN PLACE FOAM INSULATION FOR BUILDING COMPONENTS

(71) Applicant: JOHNS MANVILLE, Denver, CO (US)

(72) Inventors: Kathryn Miks, Littleton, CO (US); Ralph Michael Fay, Columbine Valley, CO (US); Yusheng Zhao, Littleton, CO (US); Chanel Charbonneau, Littleton, CO (US)

(73) Assignee: Johns Manville, Denver, CO (US)

( * ) Notice: Subject to any disclaimer, the term of this patent is extended or adjusted under 35 U.S.C. 154(b) by 249 days.

(21) Appl. No.: 17/752,422

(22) Filed: May 24, 2022

(65) Prior Publication Data
US 2023/0383550 A1 Nov. 30, 2023

(51) Int. Cl.
E04F 21/08 (2006.01)
C08G 18/66 (2006.01)
E04B 1/76 (2006.01)

(52) U.S. Cl.
CPC .......... E04F 21/085 (2013.01); C08G 18/664 (2013.01); E04B 1/7604 (2013.01)

(58) Field of Classification Search
CPC ...... B19C 44/386; B19C 44/18; E04F 21/085; C08G 18/664; E04B 1/7604; B29C 44/386; B29C 44/18
See application file for complete search history.

(56) References Cited

U.S. PATENT DOCUMENTS

| | | | |
|---|---|---|---|
| 8,495,852 B2 | 7/2013 | Fay | |
| 8,950,142 B2 | 2/2015 | Fay | |
| 9,309,663 B2 | 4/2016 | Fay | |
| 9,522,492 B2* | 12/2016 | Arnauts | E04C 2/296 |
| 10,183,425 B2* | 1/2019 | Arnauts | B29C 44/18 |
| 10,272,613 B2 | 4/2019 | Boyd | |
| 10,478,942 B2 | 11/2019 | Lipinski et al. | |
| 11,953,311 B2* | 4/2024 | Dorneanu | G01B 11/24 |
| 2020/0149297 A1* | 5/2020 | You | B29C 44/18 |
| 2020/0392279 A1* | 12/2020 | Mcadams | C08G 18/225 |
| 2021/0252543 A1 | 8/2021 | Lambach et al. | |
| 2023/0331995 A1* | 10/2023 | Orf | C08K 3/32 |
| 2023/0383550 A1* | 11/2023 | Miks | E04F 21/085 |

FOREIGN PATENT DOCUMENTS

WO 2021083969 A1 5/2021

* cited by examiner

Primary Examiner — Andrew J Triggs
(74) Attorney, Agent, or Firm — Robert D. Touslee

(57) ABSTRACT

A building component manufacturing method may include providing an insulated structural component of a building. The insulated structural component may include a frame comprising a plurality of outer components coupled together to define an outer periphery of one or more sections. At least one of the sections may include a cavity. The method may include applying a pour-in-place insulation material within the cavity to insulate the component. The pour-in-place insulation material may transition from a liquid state to a solid state to form a first layer of insulation within the cavity. The method may include monitoring a fill level within the cavity while applying the pour-in-place insulation material. The method may include controlling a flow rate of the pour-in-place insulation material based on the monitoring of the fill level within the cavity.

11 Claims, 5 Drawing Sheets

POUR IN PLACE FOAM INSULATION FOR BUILDING COMPONENTS

BACKGROUND OF THE INVENTION

Many structures may use components or panels that are prefabricated in a controlled environment out of the elements. Such prefabricated components may be built exactly the same way a framer would build a wall and/or other structural components onsite. The prefabricated components may be framed and sheathed and then stacked awaiting delivery to the job site for installation. In some cases, the prefabrication can also include installing a vapor barrier, insulation, siding, and even windows.

Such prefabricated components may be insulated using a loose fill insulation material that is blown into the insulation cavities formed within the components. Other insulation methods may include applying spray insulation or applying other forms of insulation at the job site after installation. However, such insulation methods may not be efficient, as insulation material may be wasted during the insulation process, such as due to overspraying. Additionally, the application of spray foam insulation atomizes the foam material, which may lead to hazardous volatile organic compounds (VOCs) being present in the air proximate the spray insulation equipment. This may require personnel nearby the spray foam application to wear personal protective equipment, and may necessitate the installation of specialized ventilation systems to safely manage the VOCs.

Demand for factory built or prefabricated structures remains high. As such there remains a need for increasing the efficiency of producing prefabricated components and improved methods of insulating components of factory built or prefabricated structures.

BRIEF SUMMARY OF THE INVENTION

The present technology relates to building components, such as prefabricated walls, floors, attics, or other insulated products. Some embodiments of the present technology relate to a building component manufacturing method. The method may include providing an insulated structural component of a building. The insulated structural component may include a frame comprising a plurality of outer components coupled together to define an outer periphery and one or more inner components that divide the frame into two or more sections. At least one of the sections may define a cavity. The method may include applying a pour-in-place insulation material within the cavity to insulate the component. The pour-in-place insulation material may transition from a liquid state to a solid state to form a first layer of insulation within the cavity. The method may include monitoring a fill level of the pour-in-place insulation within the cavity while applying the pour-in-place insulation material. The method may include controlling a flow rate of the pour-in-place insulation material based on the monitoring of the fill level within the cavity.

In some embodiments, the structural component may include a generally planar surface. The frame may be positioned atop one side of the generally planar surface so that at least one of the sections comprises a cavity. Applying the pour-in-place insulation material may include positioning one or more nozzles over the cavity and injecting the pour-in-place insulation material within the cavity through the one or more nozzles. The pour-in-place insulation material may be characterized by a viscosity of between about 250 centipoise and about 800 centipoise. The viscosity may be measured at a temperature of about 75 degrees Fahrenheit. The first layer of insulation may be characterized by a density between about 0.3 pounds per square foot and about 10.0 pounds per cubic foot. The first layer of insulation may be characterized by an insulation R value of greater than or about R–3 per inch of the first layer of insulation. Monitoring the fill level within the cavity may include detecting, using one or more sensors, the fill level of the pour-in-place insulation material, a fill level of the first layer of insulation, or both within the cavity. The methods may include detecting that the fill level of the pour-in-place insulation material at one or more locations of the cavity are below or above a desired fill level. The methods may include adjusting the flow rate of the pour-in-place insulation material at the one or more locations. The methods may include, subsequent to the pour-in-place insulation material transitioning to the solid state and forming the first layer of insulation, detecting at least one location of the cavity that has an incomplete fill level. The methods may include applying an additional volume of the pour-in-place insulation material within the cavity to further fill the cavity. The first layer of insulation may be applied at a site where the building component is manufactured. The site where the building component is manufactured may be remote from a site where the building component is to be installed.

Some embodiments of the present technology encompass building component manufacturing methods. The methods may include providing a structural component of a building. The structural component may include a generally planar surface and a frame comprising a plurality of outer components coupled together to define an outer periphery and one or more inner components that divide the frame into two or more sections. The frame may be positioned atop one side of the generally planar surface so that at least one of the sections comprises a cavity. The methods may include applying a pour-in-place insulation material within the cavity to insulate the structural component. The methods may include monitoring a fill level of the pour-in-place insulation material within the cavity while applying the pour-in-place insulation material. The methods may include controlling a flow rate of the pour-in-place insulation material.

In some embodiments, the generally planar surface may include one or more panels. The panels may be or include gypsum board, drywall, plywood, oriented strand boards (OSB), or foam insulation boards. The applying the pour-in-place insulation material may be characterized by an overspray of less than or about 5 vol. %. The pour-in-place insulation material may transition from a liquid state to a solid cured state to form a first layer of insulation. The pour-in-place insulation material may transition to form the first layer of insulation in less than or about 15 minutes. The pour-in-place insulation material may be or include a two component methylene diisocyanate (MDI) based polyurethane. The methods may include, in response to monitoring the fill level within the cavity while applying the pour-in-place insulation material, reducing or increasing the flow rate of the pour-in-place insulation material. The methods may include storing the building component at an offsite location relative to an installation site of the building component.

Some embodiments of the present technology encompass building component manufacturing systems. The systems may include a processing region. The processing region may be configured to receive a structural component of a building. The structural component may include a generally planar surface and a frame comprising a plurality of outer components coupled together to define an outer periphery and one or more inner components that divide the frame into two or more sections. The frame may be positioned atop one side of the generally planar surface so that at least one of the sections comprises a cavity. The systems may include one or more nozzles configured to provide a pour-in-place insulation material to the processing region. The systems may include one or more sensors configured to monitor a fill level of the pour-in-place insulation material in the cavity.

In some embodiments, the systems may include a first tracking system overhead the processing region. The first tracking system may be coupled to and provides support to the one or more nozzles. The systems may include a second tracking system overhead the processing region. The second tracking system may be coupled to and provides support to the one or more sensors. The systems may include one or more processors that are configured to control a flow of the pour-in-place insulation material through the one or more nozzles based on the fill level.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
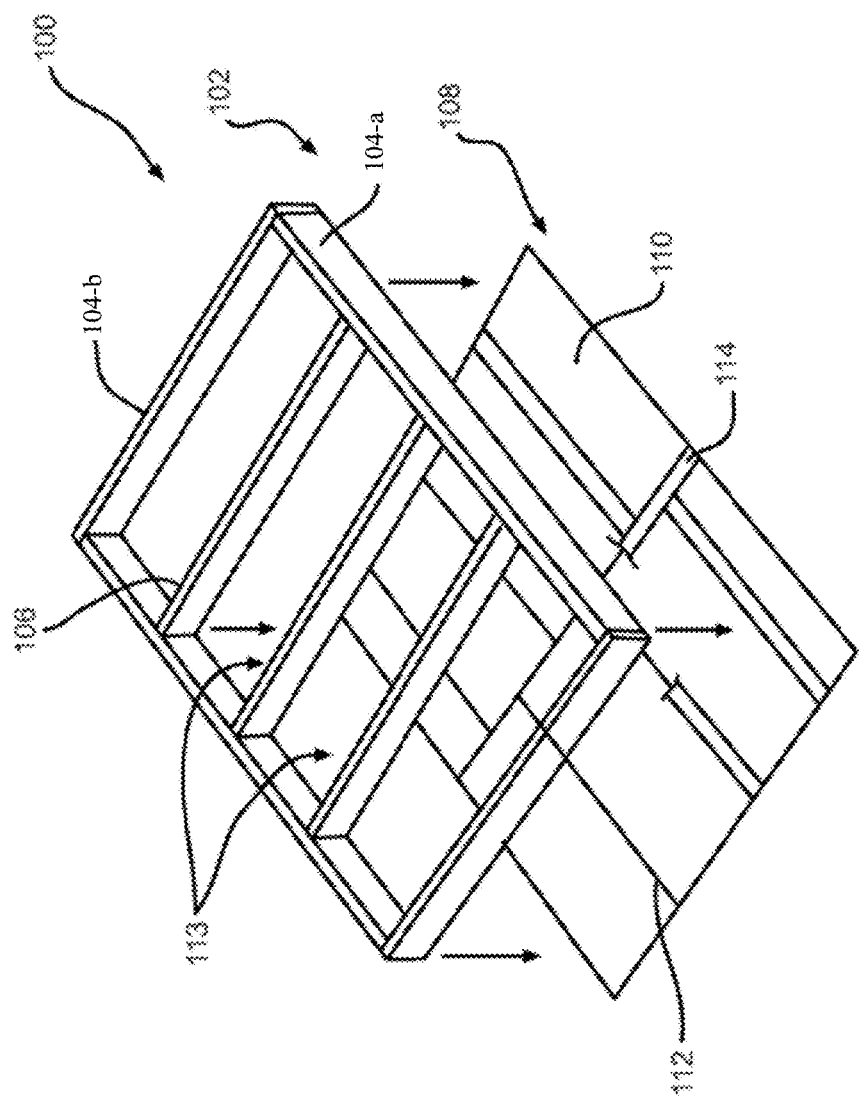
FIG. 1 illustrates a schematic perspective view of a structural component according to embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to building components, such as prefabricated, insulated building components. The insulation products may include a structural component that includes at least one layer of insulation. The structural component may take the form of any structural feature of a building, such as a wall, floor, roof, and/or portion thereof. In some embodiments, the structural component may include a plurality of metal or wood studs used to form a frame. One or more substrate or backing layers may be provided that close one side of the frame and may provide a base on which the insulation material may be poured. The layer of insulation may be disposed within one or more cavities formed within the structural component. The layer of insulation may be a pour-in-place insulation, which may be applied using one or more nozzles and/or other outlet ports. Furthermore, one or more sensors, such as optical sensors, may monitor the application of insulation material to the structural component. For example, the sensors may continuously monitor a fill level of the pour-in-place insulation as the insulation is being applied to ensure that the amount of insulation supplied is sufficient to fill the cavities to a desired level (e.g., full fill, partial fill, edge fill, etc.), while accounting for the rise and/or other expansion of the insulation as the foam sets. The sensor data may be communicated to one or more processors that control operation of the nozzles, which may enable a flow rate of the foam dispensed by the nozzles to be adjusted and/or shut off to provide an efficient application of insulation material to achieve the desired fill level without overfilling the cavity, thereby reducing, minimizing, and/or eliminating waste of the insulation material. The sensors and nozzles may also facilitate automation or remote operation of the insulation process. For example, the sensor data may be fed to an artificial intelligence module that may adjust the flow rate, position, pressure, temperature, and/or other operational parameters of the nozzles to efficiently achieve a desired fill level within the cavities. Similarly, sensor data may be provided to a graphical user interface that may enable a human operator to observe the fill level across one or more cavities such that the human operator may remotely control operation of the nozzles using a control panel and/or other input device to achieve the desired fill level. Automation and/or remote operation may lead to safer conditions, and may reduce or eliminate the need for enhanced safety measures common during insulation applications.

Referring to FIG. 1, an exploded perspective view of a structural component 100 of a structure, such as a manufactured or modular home or a modular building, is schematically depicted. Structural component 100 may be, but is not limited to, a floor, wall, roof, attic, and the like of the structure. Structural component 100 may include a generally planar surface 108 and a frame 102 positioned atop one side of planar surface 108. While discussed primarily in the context of planar structural components, it will be appreciated in that in some embodiments the structural component may be curved, such as to provide a curved wall or other structure. Planar surface 108 may include one or more panels 110 that are positioned such that adjacent sides of the panels 110 abut at a seam 112. Some or all of the seams 112 may be sealed using an adhesive tape 114. While shown with a single layer of panels 110, it will be appreciated that in various embodiments multiple layers of panels 110 may be provided. Panels 110 may include gypsum boards (i.e., drywall), plywood, oriented strand boards (OSB), foam insulation boards, and/or other materials known in the building industry. Such materials may be used, for example, when the planar surface 108 is intended to form an interior facing surface of a structure. In some embodiments, the panels planar surface 108 may include a continuous insulation or an exterior sheathing. Such materials may be used, for example, when the planar surface 108 is intended to form an exterior facing surface of a structure.

Frame 102 may include outer components 104-*a* and 104-*b* that may be coupled together to define an outer periphery of frame 102. Frame 102 may also include one or more inner components 106 that are coupled with the inner surface of opposing outer components 104-*a*. Outer components 104-*a* and 104-*b* and/or inner components 106 may be or include wood studs, metal studs, metal beams, or combinations thereof. The inner studs 106 may divide frame 102 into two or more sections 113. In some embodiments, such as when the structural component 100 is a wall structure, the inner studs 106 and outer components 104-*a* and 104-*b* may be provided at standard intervals, such as between 16 inches and 24 inches on center. Opposing components 104-*a* may define a longitudinal length of frame 102 and opposing components 104-*b* may define a transverse length of frame 102, which may be shorter than the longitudinal length. At least one of the sections may define a cavity. For example, when frame 102 is positioned atop planar surface 108, one or more of sections 113 may define a cavity or hollow space between opposing components 106 and 104-*a* and planar surface 108.

Frame 102 may be positioned atop one side of planar surface 108 and may be coupled therewith. Coupling frame 102 and planar surface 108 may include adhesively bonding outer components 104-*a* and 104-*b* and/or inner components 106 with planar surface 108. Additionally or alternatively, coupling frame 102 and planar surface 108 may include mechanically fastening (e.g., nails, screws, staples, and the like) components 104-*a*, 104-*b*, and/or 106 with planar surface 108. In some embodiments, frame 102 may not be adhesively coupled with planar surface 108 prior to insulating the structural component 100 or may be loosely coupled therewith using one or more nails, screws, and/or staples. In such embodiments the insulating material applied may adhesively couple the frame 102 with planar surface 108. The insulating material may be any type of insulating material that may be applied within a cavity or hollow area (e.g., poured) in a fluid state or semi-fluid state.

Figure 2A:
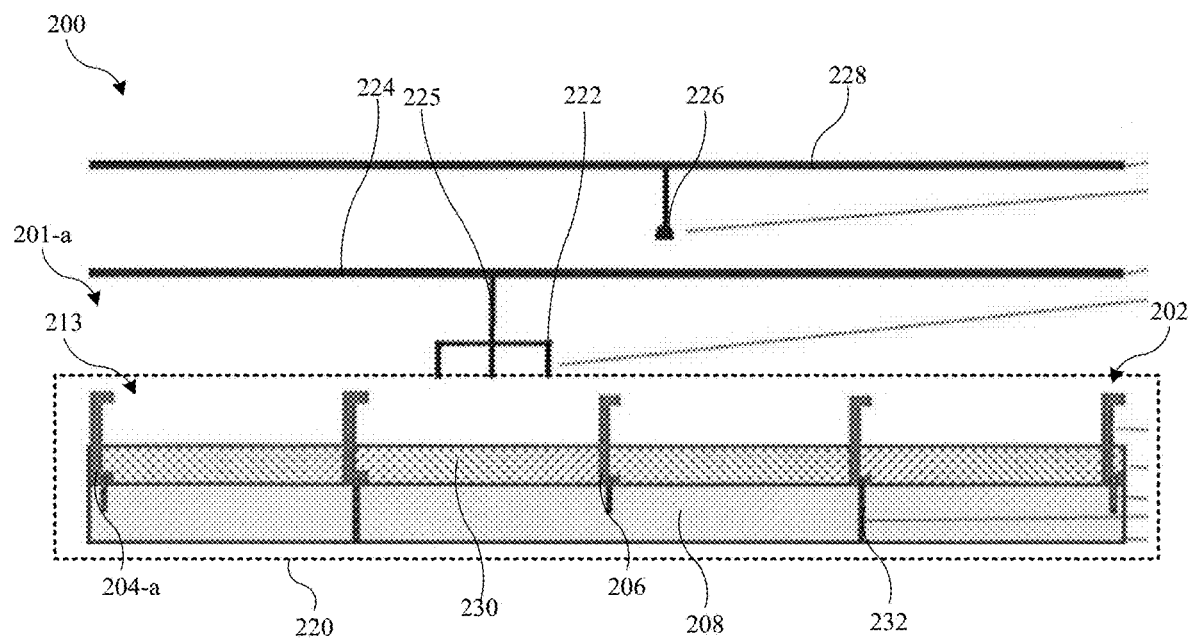
FIG. 2A-B illustrate side elevation views of a building component processing system according to embodiments of the present invention.
Figure 2B:
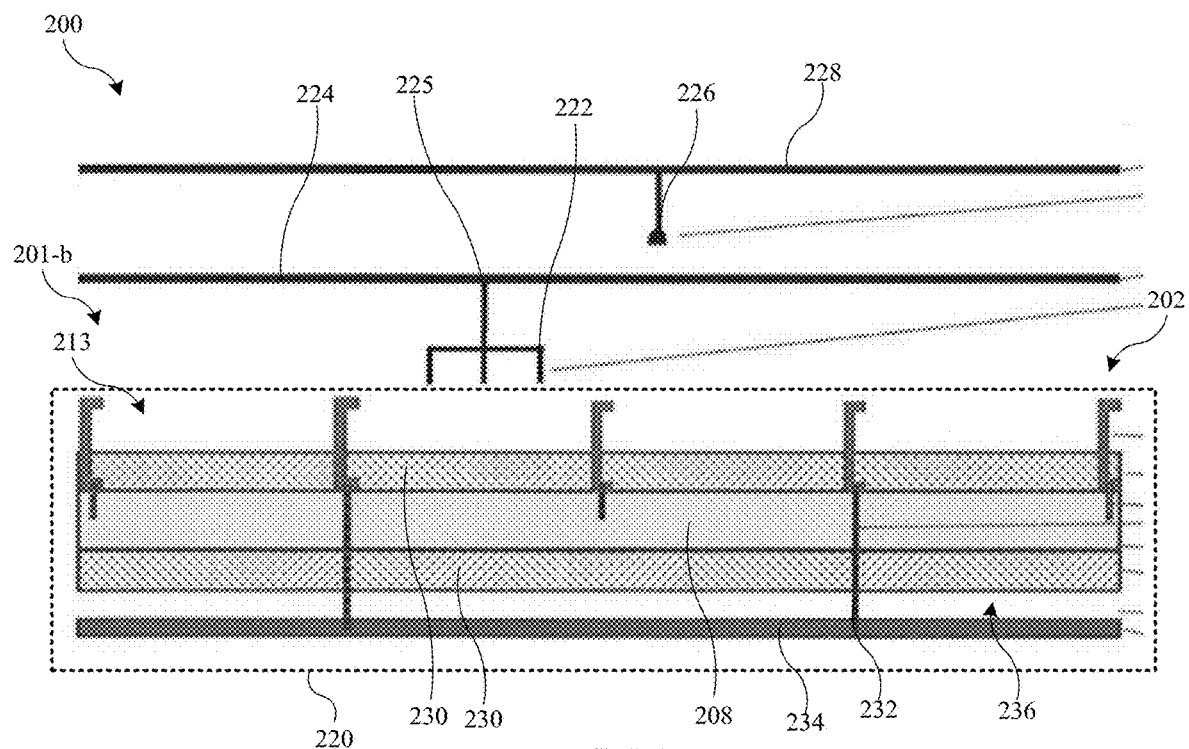

FIGS. 2A-2B illustrate one embodiment of a building component manufacturing system 200. The system 200 may be provided at a manufacturing facility, such as a factory, and/or may be provided in the field, such as at a construction site. The system 200 may include a processing region 220. The processing region 220 may be configured to receive a structural component 201 of a building. The structural component 201 may be the same or similar to structural component 100 and may include any feature previously discussed with respect to structural component 100. For example, the structural component 201 may include a generally planar surface 208 and/or a frame 202 having a plurality of outer components 204-*a* coupled together to define an outer periphery and one or more inner components 206 that divide the frame 202 into two or more sections 213. Similarly, the frame 202 may be positioned atop one side of the generally planar surface 208 so that at least one of the sections 213 may define a cavity for receiving insulation material.

As noted above, the planar surface 208 may include a number of panels, similar to panels 110, which may form a backing or other substrate of the structural component 201. This substrate may be formed of various materials, such as gypsum, OSB, plywood, exterior sheathing, foam insulation boards, other insulation boards, mats, or batts, and the like. The material of the substrate may be based on an intended use for the structural component 201. The various components of frame 202 may extend a distance from a surface of the substrate. Oftentimes, the frame components may extends between about 3.5 and 5.5 inches from the substrate (such as for 2×4 and/or 2×6 framing studs), however other distances are possible based on the needs of a particular application. In some embodiments, a structural component 201-*a* may include a single layer of pour-in-place insulation material 230 that may be applied on one side of a substrate layer of the planar surface 208. In other embodiments, a structural component 201-*b* may include a multiple layers of pour-in-place insulation material 230 that may be applied on either side of a substrate layer of the planar surface 208. In some embodiments, the structural component 201*b* may include a drainage plane 236 and/or exterior cladding 234 positioned on an exterior side of the planar surface 208.

The system 200 may include one or more nozzles 222. The one or more nozzles 222 may be configured to provide a pour-in-place insulation material to the processing region 220. The system 200 may also include one or more sensors 226, such as optical sensors. For example, the optical sensors may include 3-dimensional depth cameras, stereo 3-dimensional sensors, structured light sensors, time-of-flight sensors (e.g., LiDAR sensors, time-of-flight cameras, etc.), mmWave sensors, and/or other depth sensors. The sensors 226 may be configured to perform a variety of operations. For example, the sensors 226 may be configured to monitor a fill level of the pour-in-place insulation material in the cavity. This fill level data may be provided to one or more processors (not shown) that control operation of the one or more nozzles 222. The fill level data may be used by the processors to control a flow of the foam, such as by turning the flow on or off and/or by adjusting a flow rate, position, temperature, pressure, etc. of the foam dispensed from the nozzles. For example, the processor may be operable to adjust the flow rate of the insulation material based on data received from the one or more sensors 226 to ensure that each cavity is filled to a desired fill level, while reducing, minimizing, and/or eliminating overfilling. For example, the processors may control one or more valves within a foam delivery assembly to adjust the flow rate of foam through each of the nozzles 222.

The system 200 may include a first tracking system 224 positioned overhead of the processing region 220. The first tracking system 224 may be coupled to and may provide support to the one or more nozzles 222. During operation, a controller may direct the one or more nozzles 222 to move along the first tracking system 224 to various sections 213 of the structural component 201. The nozzles 222 may be configured to direct an insulation material, such as pour-in-place insulation material, from a holding tank (not shown) to each cavity provided within the frame 202. As shown in FIGS. 2A-2B, the first tracking system 224 may include an output conduit 225 that couples to a number of nozzles 222. However, it is contemplated that the first tracking system 224 may include any number of output conduits 225, such as two output conduits 225, three, four, five, six, seven, or more output conduits 225, with each output conduit 225 being fluidly coupled with one or more of the nozzles 222. Furthermore, the system 200 may include a plurality of first tracking systems 224, each first tracking system 224 having one or more output conduits 225 that are each fluidly coupled to one or more nozzles 222. For example, each output conduit 225 may include one nozzle 222, two, three, four, five, six, seven, or more nozzles 222. Depending on the structural component 201 being processed, and the dimensions of the cavity, additional nozzles 222 may provide better distribution of insulation material in the cavity. It is also contemplated that, in addition to or in the alternative to first tracking system 224, the system 200 may include one or more robotic arms that may be coupled to and may provide support to the one or more nozzles 222. Additionally or alternatively, the system 200 may be configured to or operable to move or reposition the structural component 201 with respect to the first tracking system 224 and/or the one or more robotic arms.

In embodiments, the one or more nozzles 222 may be in a fixed position relative to the processing region 220. In such embodiments, the processing region 220 may be configured to move the structural component 201 relative to the one or more nozzles 222. However, it is also contemplated that both the nozzles 222 and the structural component 201 may both be fixed and/or movable during processing. The insulation material, such as the pour-in-place insulation material, may have a sufficient viscosity and/or flow rate to provide insulation material to all or substantially all of each cavity until a desired fill level is reached.

The system 200 may include a second tracking system 228 overhead the processing region 220. The second tracking system 228 may be coupled to and may provide support to the one or more sensors 226. The second tracking system 228 may be disposed above or below the first tracking system 224. The second tracking system 228 may also be level with the first tracking system 224. For example, the second tracking system 228 may extend around an outer periphery of the first tracking system 224. It is also contemplated that, in addition to or in the alternative to second tracking system 228, the system 200 may include one or more robotic arms that may be coupled to and may provide support to the one or more sensors 226. Additionally or alternatively, the system 200 may be configured to or operable to move or reposition the structural component 201 with respect to the second tracking system 228 and/or the one or more robotic arms.

In some embodiments, a human operator may monitor and/or direct the delivery of the pour-in-place foam from a location remote from the processing region 220. For example, the operator may be in a different room and/or be separated from the system 200 via one or more partitions. The operator may utilize one or more input devices, such as control panels, touchscreens, and/or other remote control mechanisms to control various features of the foam delivery. For example, the operator may adjust a flow rate, temperature of the foam, temperature of an environment in which the system is disposed, a pressure of the environment, a location of the nozzles 222, and/or other operational parameters to fill each cavity to a desired fill level. The operator may view fill data from the sensors 226, foam property data from other sensors, and/or data from environmental sensors of the system 200 to adjust and/or otherwise control the operational parameters of the system 200. Additionally, the input devices may enable the operator to steer and/or otherwise control the relative movement between the structural component 201 and the nozzles 222.

In other embodiments, the operation of the system 200 may be automated, such as by using a pre-programmed robotic controller and/or an artificial intelligence controller. Such systems may operate autonomously, with or without any human oversight. For example, one or more processors may be pre-programmed to control the relative movement between the structural component 201 and the nozzles 222 and/or to adjust one or more operational parameters of the system 200 based on detected sensor conditions from various sensors 226, foam property sensors, and/or environmental sensors. In other embodiments, the processors may be trained with machine learning algorithms to automatically adjust the position and/or other various operational parameters of the system in response to the sensor conditions.

In some embodiments, data from optical sensors, which may the same or different than sensors 226, may be used to help control movement of the nozzles 222 relative to the structural component 201. For example, image data from one or more cameras may be analyzed, such as using machine learning object detection techniques, to identify the size, shape, and location of cavities formed within the structural component 201. Based on the identification of the cavities, the processors may control the movement of the structural component 201 and/or nozzles 222 to deliver a desired volume of foam to each location within a given cavity.

In conventional technologies, hazardous VOCs may be present during processing. VOCs may be common with high pressure, elevated temperature, and various insulation materials, such as two component spray polyurethane products. These compounds, which may be hazardous to personnel in proximity to the insulation material, may require extensive venting and/or exhaust systems to mitigate risks, in addition to personnel nearby wearing sufficient personal protection equipment (PPE). However, embodiments of the present invention may utilize pour-in-place insulation foams that may reduce and/or eliminate the amount of VOCs generated (such as by not atomizing the foam material) and, therefore, may reduce the need for specialized venting and/or exhaust equipment. Additionally, such pour-in-place systems may eliminate the need for operators to wear PPE when in close proximity to the system 200.

Some VOCs may include, but are not limited to, 4,4'-methylenediphenyl diisocyanate, 1,2-dichloro-propane, toluene, chloro-benzene, octamethyl-cyclotetrasiloxane, decamethyl-cyclopentasiloxane, triethyl phosphate, formaldehyde, and aldehyde. Embodiments may utilize pour-in-place insulation foams that may maintain levels of 4,4'-methylenediphenyl diisocyanate below or about 0.05 mg/m$^3$, 1,2-dichloro-propane below or about 46.21 mg/m$^3$, toluene below or about 75.36 mg/m$^3$, chloro-benzene below or about 46.03 mg/m$^3$, octamethyl-cyclotetrasiloxane below or about 121.31 mg/m$^3$, decamethyl-cyclopentasiloxane below or about 151.64 mg/m$^3$, triethyl phosphate below or about 7.45 mg/m$^3$, formaldehyde below or about 0.12 mg/m$^3$, and aldehyde below or about 45.0 mg/m$^3$. Such levels may be below permissible concentrations in indoor air calculated using time weighted average (TWA) exposure values provided in the American Conference of Government Industrial Hygienists (ACGIH)—The Threshold Limit Values Handbook (2020).

As illustrated in FIG. 2A, the system 200 may apply insulation material 230, such as pour-in-place insulation material, to a structural component 201-$a$ having a continuous insulation or exterior sheathing that forms generally planar surface 208. The continuous insulation or exterior sheathing may be coupled to the frame 202 using any type of fasteners 232. As illustrated in FIG. 2B, the system 200 may apply insulation material 230, such as pour-in-place insulation material, to both sides of a structural component 201 having a continuous insulation as a generally planar surface. The insulation material 230 may be applied in either order to both surfaces of the generally planar surface. Furthermore, an exterior cladding 234 may be coupled to the component via fasteners 232 after the corresponding layer of insulation material 230 has been poured, with the fasteners 232 extending through the insulation material 230, continuous insulation, and attaching to the frame 202. A drainage channel 236 may be disposed between the exterior cladding 234 and insulation material in some embodiments.

Figure 2C:
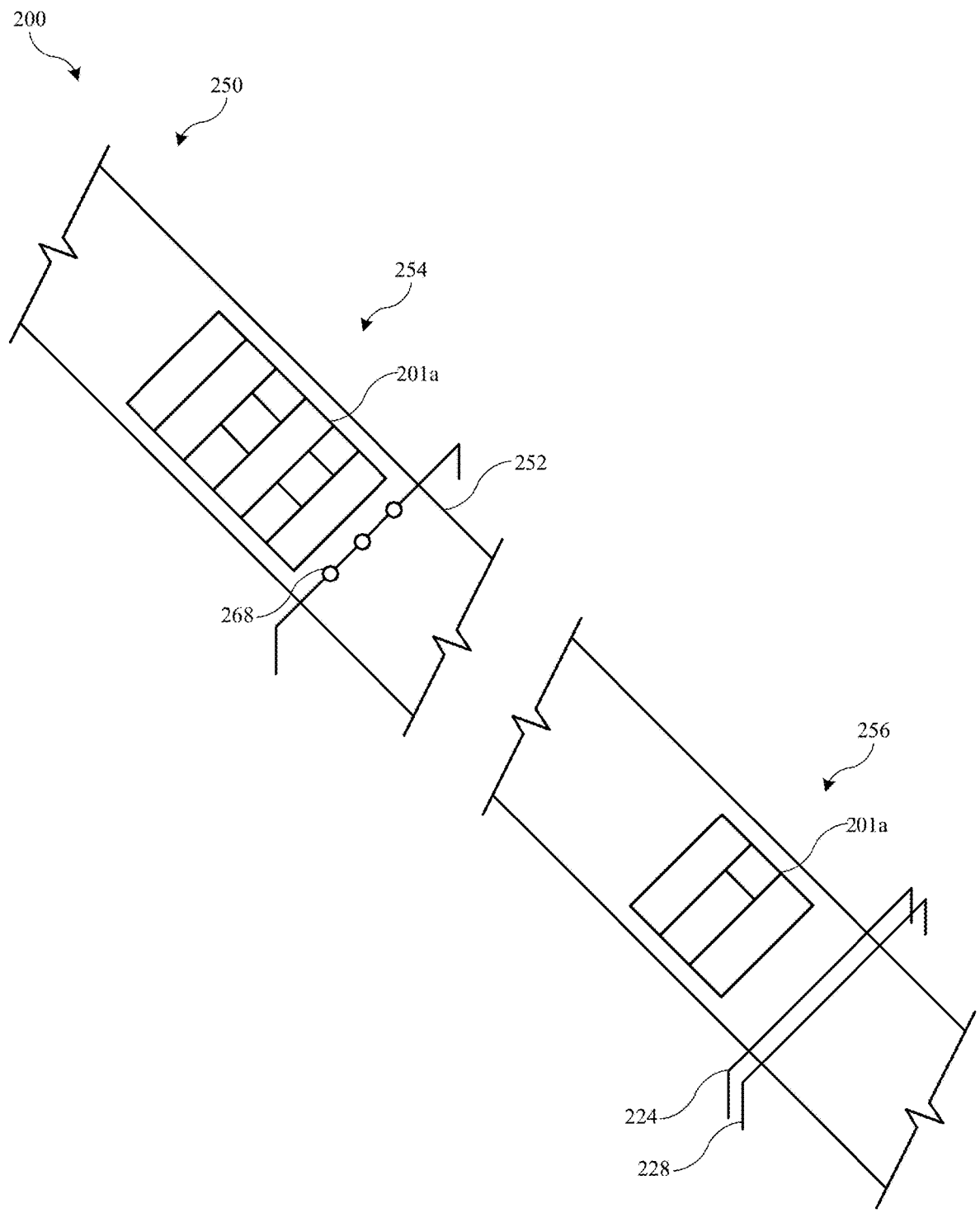
FIG. 2C illustrates an overhead view of a building component processing system according to embodiments of the present invention.

As illustrated in FIG. 2C, the system 200 may include an assembly line 250 for transporting the structural component 201-*a* along various stations. The assembly line 250 may include a conveyor belt 252 or any other transport mechanism for shifting the structural component 201-*a* between stations. For example, a first station (not shown) may assemble the structural component 201-*a* (although in some embodiments the structural component 201-*a* may be pre-assembled prior to being delivered to the assembly line 250). A sensing station 254 up-line of an application station 256 may scan or otherwise sense the structural component 201-*a* using a number of sensors 268 (such as optical sensors, depth sensors, etc.). For example, the sensors 268 may be used to determine a size, layout (e.g., position of inner support members, cavity positions, etc.), position, orientation (e.g., angular position relative to the transport mechanism), depth, and/or other characteristic of the structural component 201-*a*. The scanning of the structural component 201-*a* at the sensing station 254 may transmit information to the application station 256 related to the various characteristics of the structural component 201-*a*. Based on the size, layout, position, orientation, depth, and/or other characteristics, one or more processors may determine where/how much insulation material 230 needs to be applied to the structural component 201-*a* at the application station 256. For example, the processors may direct the application station 256 to pour the insulation material into each detected cavity location to a predetermined depth (which may be based on the depth of the structural component 201-*a*). Relative movement between the structural component 201-*a* and applicators of the application station 201-*a* may be controlled based on the size, layout, position, orientation, and/or other characteristics of the structural component 201-*a*.

As illustrated in FIG. 2C, structural components 201-*a* of different configurations may be processed successively. Thus, the optical sensors 268 of the sensing station 254 may detect the configuration of the structural components 201-*a* and relay information to the application station 256. The application station 256 may include the first tracking system 224 and second tracking system 228, or respective alternatives, as previously discussed. The information may allow for the efficient application of insulation material 230, minimizing overspray and increasing throughput.

Figure 3:
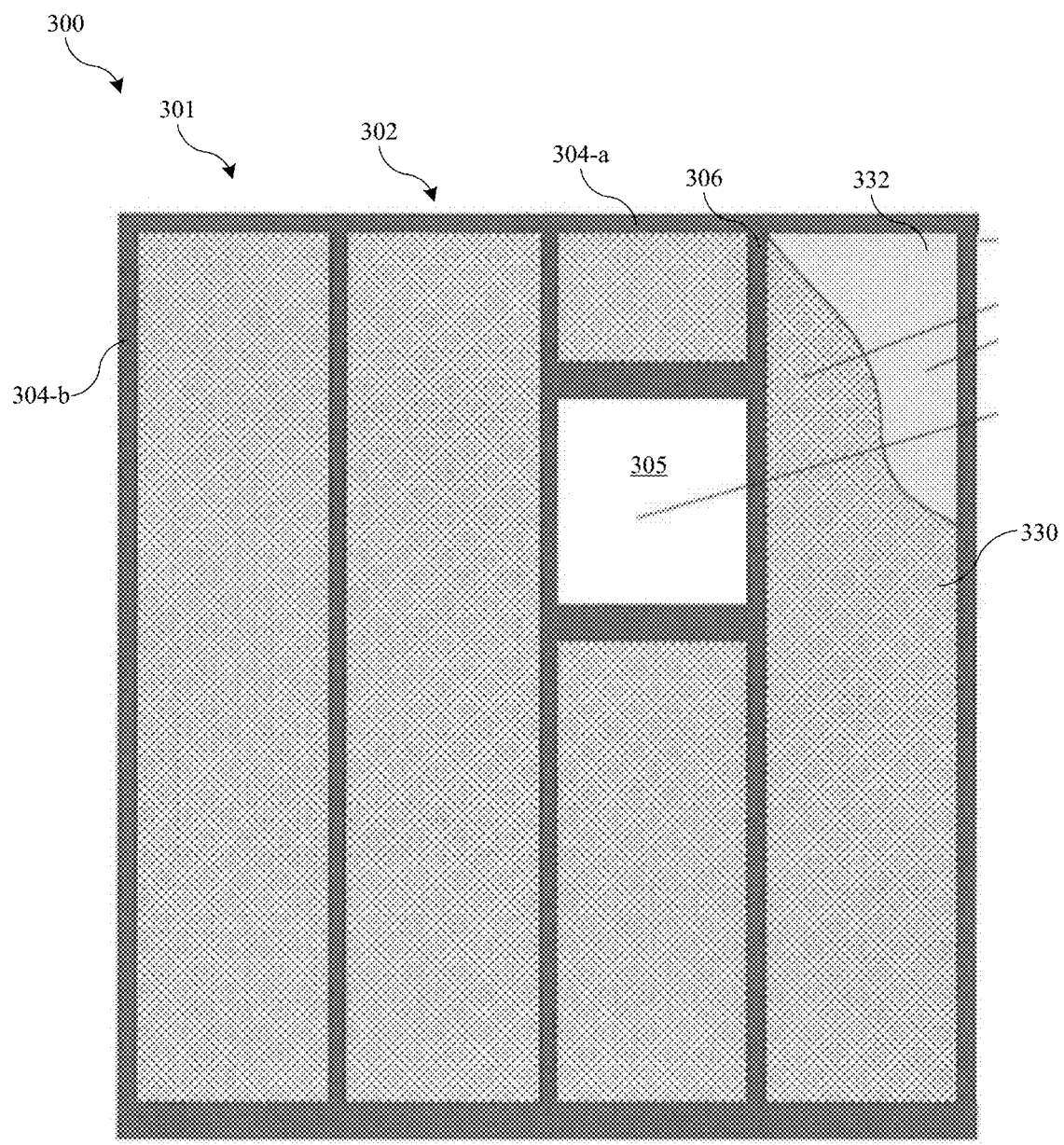
FIG. 3 illustrates a partial cutaway plan view of a building component according to embodiments of the present invention.

FIG. 3 shows a partial cutaway plan view of a building component 300, such as a building component manufactured using system 200. Building component 300 may include a structural component 301 similar to or the same as structural component 100. For example, the structural component 301 may include a generally planar surface (not shown) and a frame 302 positioned atop one side of planar surface. Frame 302 may include outer components 304-*a* and 304-*b* that may be coupled together to define an outer periphery of frame 302. Frame 302 may also include one or more inner studs 306 that are coupled with the inner surface of opposing outer components 304-*a*.

In embodiments, the frame 302 may define one or more voids or openings 305. The voids or openings 305 may be left unfilled from insulation material to provide a space for a window or doorway, for example. It is contemplated that the frame 320 may define multiple voids or openings 305, such as one opening or more voids or openings 305 for multiple windows and/or one or more openings 305 for multiple doors.

A layer of continuous insulation or exterior sheathing 332 may be disposed on one side of the frame 302. Insulation material 330, such as pour-in-place insulation material, may be provided over the layer of continuous insulation or exterior sheathing 332. As previously discussed with regard to FIG. 2B, in embodiments having a layer of continuous insulation disposed on one side of the frame 302, insulation material 330, such as pour-in-place insulation material, may be provided on both sides of the continuous insulation.

Figure 4:
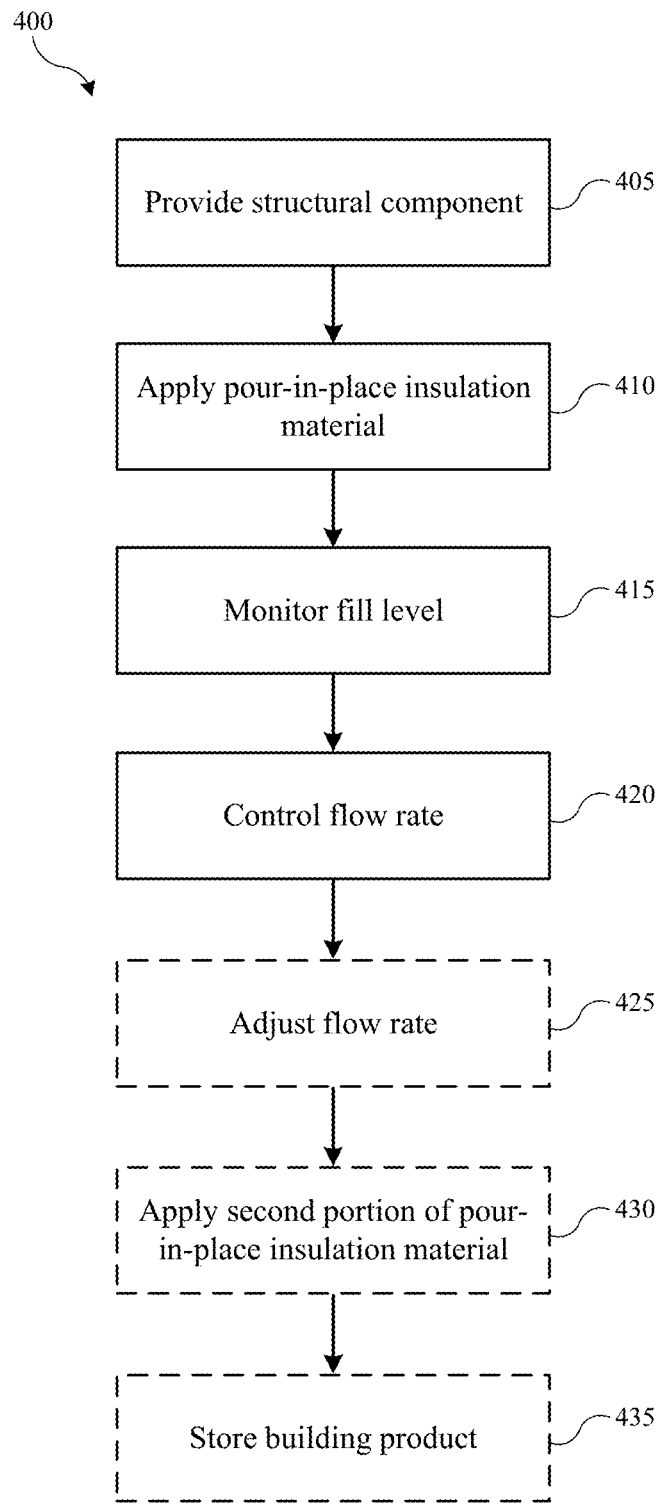
FIG. 4 schematically depicts a building component manufacturing method according to embodiments of the present invention.

FIG. 4 shows a building component manufacturing method 400 according to embodiments of the present invention. The method 400 may be performed using a system similar to system 200. However, the method 400 is not limited to system 200 and it is contemplated that any other system may be used to employ the steps of method 400. Furthermore, the method 400 may be used to manufacture a building component similar to building component 300. At operation 405, the method 400 may include providing a structural component of a building. The structural component may be the same as or similar to structural component 100, 201-*a*, 201-*b*, or 301. For example, the structural component may include a generally planar surface and/or a frame comprising a plurality of outer components coupled together to define an outer periphery and one or more inner components that divide the frame into two or more sections. Similarly, the frame may be positioned atop one side of the generally planar surface so that at least one of the sections may include a cavity.

At operation 410, the method 400 may include applying an insulation material within the cavity to insulate the structural component. While it is contemplated that the insulation material may be provided with human control, applying the pour-in-place insulation material may include positioning one or more nozzles over the cavity. The nozzles may be similar to or the same as nozzles of system 200. After positioning the nozzles over the cavity, the method 400 may include injecting insulation material within the cavity through the one or more nozzles.

In embodiments, the insulation material may be or include a pour-in-place insulation material. The pour-in-place insulation material may be provided to the structural component in a liquid state or a fluid/semi-fluid state. The pour-in-place insulation material may transition from the liquid state or the fluid/semi-fluid state to a solid state or semi-solid state. As the pour-in-place insulation material transitions between states, the insulation material may form a first layer of insulation within the cavity. The pour-in-place insulation material may be provided as an A-side component (e.g., the isocyanate-containing compound) and a B side component (e.g., the isocyanate-containing compound), which may be mixed or otherwise combined at the time of pouring to generate the final pour-in-place foam insulation material.

In embodiments, the pour-in-place insulation material may expand during the transition from the liquid or fluid/semi-fluid to the solid/semi-solid state. The pour-in-place insulation material and/or the resultant first layer of insulation may be an open or closed cell foam. For example, the pour-in-place insulation material may be a two component methylene diisocyanate (MDI) based polyurethane. In embodiments, the first component of the two component foam may be or include a polymeric isocyanate containing reactive isocyanate groups. The second component may be a combination of polyols, catalytic agents, and/or a blowing agent such as, for example, HFO 1233zd, HFC-245fa, HFC-365mfc, water, and the like.

The pour-in-place insulation material may be characterized by a viscosity of between about 250 centipoise (cps)

and about 800 cps, wherein the viscosity is measured at a temperature of about 75 degrees Fahrenheit (° F.). A viscosity between about 250 cps and about 800 cps may allow for sufficient distribution within the cavity when applying the pour-in-place insulation material. At viscosities lower than 250 cps, the insulation material may take longer to cure, as will be described below. At viscosities greater than 800 cps, the insulation material may not fully distribute throughout the cavity, leaving portions of the cavity uninsulated after curing. Accordingly, the pour-in-place insulation material may have a viscosity between about 300 cps and about 750 cps, such as between about 300 cps and about 700 cps, between about 350 cps and about 700 cps, between about 350 cps and about 650 cps, between about 400 cps and about 650 cps, or between about 400 cps and about 600 cps.

In embodiments, the B-side component of the pour-in-place insulation material may include between about 0 wt. % and about 70 wt. % polyester polyol, between about 0 wt. % and about 70 wt. % polyether polyol, between about 5 wt. % and about 15 wt. % flame retardant, between about 0.3 wt. % and about 3 wt. % catalyst, between about 1 wt. % and about 3 wt. % surfactant, between about 0 wt. % and about 3 wt. % additive, between about 1 wt. % and about 3 wt. % water, and between about 5 wt. % and about 15 wt. % HFC/HFO. Examples of such pour-in-place insulation materials may be or include PIP Foam 250A and PIP Foam 50 manufactured by Huntsman and ENVELO-POUR™-SFC-I-2.0-CG polyurethane pour foam manufactured by SPI.

The application of the pour-in-place insulation material may be characterized by an overspray of less than or about 5.0 vol. % based on the total application of material in the cavity. The pour-in-place insulation material may have a greater degree of control due to the flow characteristics of the material. Accordingly, the application of the pour-in-place insulation material may be characterized by an overspray of less than or about 4.0 vol. %, less than or about 3.0 vol. %, less than or about 2.0 vol. %, less than or about 1.0 vol. %, or less. In embodiments, the application of the pour-in-place insulation material may result in a complete elimination of overspray.

As previously discussed, the pour-in-place insulation material may transition from the liquid state or the fluid/semi-fluid state to a solid state or semi-solid state to form a first layer of insulation. In order to maintain a desired throughput in manufacturing, the pour-in-place insulation material may have a set time of less than or about 15 minutes. Set time may be tuned by varying properties of the pour-in-place insulation material. For example, viscosity may be increased or chemical makeup of the insulation material may be modified to adjust set time. Furthermore, temperature (e.g., processing temperature and ambient temperature) may be adjusted to vary the set time. In embodiments, the set time may be less than or about 14 minutes, less than or about 13 minutes, less than or about 12 minutes, less than or about 11 minutes, less than or about 10 minutes, 9 minutes, less than or about 8 minutes, less than or about 7 minutes, less than or about 6 minutes, less than or about 5 minutes, less than or about 4 minutes, less than or about 3 minutes, or less.

The first layer of insulation, or the pour-in-place insulation material in the solid/semi-solid state, may have an insulation R value of greater than or about 3.0 per inch of insulation material, and may have an insulation R value of greater than or about 3.5, greater than or about 4.0, greater than or about 4.5, greater than or about 5.0, greater than or about 5.5, greater than or about 6.0, greater than or about 6.5, greater than or about 7.0, greater than or about 7.5, greater than or about 8.0, greater than or about 8.5, greater than or about 9.0, or higher. In embodiments, the first layer of insulation may have an insulation R value of between about 3.0 and about 8.0 per inch of insulation material, such as between about 5.0 and about 7.0.

The first layer of insulation may be characterized by a density of less than or about 5.0 pounds per cubic foot (pcf). At higher densities, a tradeoff between insulative properties and weight may be realized. Specifically, the resultant building component may have increased weight without a corresponding increase in insulative properties. Accordingly, the first layer of insulation may be characterized by a density of less than or about 4.5 pcf, less than or about 4.0 pcf, less than or about 3.5 pcf, less than or about 3.0 pcf, less than or about 2.5 pcf, less than or about 2.0 pcf, less than or about 1.5 pcf, less than or about 1.0 pcf, less than or about 0.5 pcf, or less. In embodiments, the first layer of material may be characterized by a density of between about 0.3 pcf and about 5.0 pcf, or between about 1.0 pcf and about 2.0 pcf. For example, in the application of an open cell foam, the first layer of material may be characterized by a density of between about 0.3 pcf and about 1.0 pcf. In the application of a closed cell foam, the first layer of material may be characterized by a density of between about 1.5 pcf and about 5.0 pcf.

At operation 415, the method 400 may include monitoring a fill level within the cavity, such as across a portion of or the entire cavity, while applying the pour-in-place insulation material. For example, sensors, such as the sensors 226 of system 200, may be used to monitor the fill level of the pour-in-place foam at one or more locations within the cavity. Monitoring the fill level within the cavity may optionally include positioning one or more sensors over the cavity, although in some embodiments, the sensors 226 may be at other locations relative to the cavity and/or structural component. The sensors may be optical sensors similar to or the same as sensors 226 of system 200. In some embodiments, multiple locations may be sampled, with may enable a fill distribution (e.g., a coverage of the insulation material within the cavity) to be monitored, which may be used to ensure that the insulation material is distributed substantially evenly (e.g., has a substantially uniform thickness) within the cavity.

At operation 420, the method 400 may include, controlling a flow rate of the pour-in-place insulation material based on the monitoring of the fill level within the cavity. For example, operation 420 may include halting a flow of the insulation material as the fill level within the cavity rises. As the structural component may define a plurality of cavities, the flow of the insulation material may be intermittently halted to move to unfilled cavities.

Moreover, at optional operation 425, the method 400 may include adjusting the flow rate of the pour-in-place insulation material at one or more locations within a cavity. As previously discussed, the insulation material may expand as the pour-in-place insulation material cures and transitions to the solid final form of the first layer of insulation. The monitoring of the fill level may track the pour height, as well as a rise/expansion height of the foam. Processors of the foam dispensing system may use such data to modify the flow rate and/or shut off the flow of foam to deliver a substantially uniform thickness of foam (to a desired fill level) to each cavity. For example, based on the fill level data within the cavity, the processors may determine that the fill level is above or below a desired fill level and may adjust the flow rate and/or shut down of the foam accordingly. The flow rate of the insulation material may be adjusted in response to the fill level of the first layer of insulation being above, below, or at the frame (or other desired fill level), during and/or after curing/expansion. For example, if the pour-in-place foam extends above the desired fill level, the method 400 may include shutting off the flow of the pour-in-place insulation material. Similarly, if the pour-in-place foam is below the desired fill level, the flow rate may be adjusted or kept constant until the desired fill level is reached. In some embodiments, the flow rate adjustments may compensate for a predicted amount of expansion of the foam. For example, the processors may utilize empirical expansion data, current expansion rates, and/or other information to predict how much more a given region of pour-in-place foam will expand. Based on the predicted expansion, the flow rate of foam may be tuned to deliver an amount of foam that is likely to reach the desired fill level without dispensing significant excess foam. It will be appreciated that the flow rate may be adjusted in a single cavity, in one or more cavities, in all cavities, or in a portion of a single cavity. In some embodiments that utilize one or more artificial intelligence processors, any adjustments to flow rates (or other operational parameters of the insulation pouring system) may be logged, enabling the processors to account for such adjustments when dispensing foam into subsequent cavities. As just one example, if one cavity is overfilled, a flow rate and/or other operational parameters may be adjusted for a subsequent cavity (such as a cavity of similar size and shape) to prevent the subsequent cavity from being overfilled.

In embodiments, operation 425 of the method 400 may include adjusting, or reducing, the flow rate during the fill of a single cavity to provide a precise amount of insulation material being provided to the cavity. For example, the method 400 may include using a higher flow rate when initially providing the pour-in-place insulation material to the cavity, then reducing the flow rate towards the end of filling the cavity to provide a precise fill level.

At optional operation 430, the method 400 may include applying a second portion of the pour-in-place insulation material. Subsequent to the pour-in-insulation material transitioning to the solid state and forming the first layer of insulation, the method 400 may include detecting portions of the cavity having an incomplete fill level, or fill level below the edge of the frame (or other desired fill level). In order to completely fill the cavity with the first layer of insulation, the method 400 may include applying a second portion of the pour-in-place insulation material within the cavity to further insulate the structural component. In embodiments, any number of passes of foam may be dispensed, such as three passes, four passes, five passes, six passes, seven passes, or more to fill the cavity to the desired fill level with the pour-in-place insulation material to form a first layer of insulation of a desired thickness. It is also contemplated that the first layer of insulation may not extend entirely to a desired fill level of the cavity and that a second, different layer of insulation may be formed by providing a different insulation material to the structural component. For example, in some embodiments the desired fill level may be a partial fill, which may leave space between an exposed surface of the first layer of insulation and a distal end of the frame members. In such embodiments, another form of insulation, such as, but not limited to a fiberglass batt, may be positioned within the space. In some embodiments multiple types of pour-in-place foam may be poured into a cavity. For example, foams of differing density may be used. In embodiments, one layer of pour-in-place foam may include a closed cell foam and another layer of pour-in-place foam may include an open cell foam. In a particular embodiment, a closed cell foam may be applied in an edge-framed fashion, with a subsequent application of a pour-in-place open cell foam and/or other insulation material. Any number of layers may be formed in the cavity.

In embodiments, subsequent to optional operation 430, the method 400 may include applying insulation material to a second side of the structural component. As previously discussed with regard to FIG. 2B, insulation material, such as pour-in-place insulation material may be applied to both surfaces of the generally planar surface. For example, the method 400 may include applying insulation material to a first surface of the generally planar surface, such as the surface having the frame and cavities. The method 400 may then include manipulating the structural component to apply insulation material to a second surface of the generally planar surface. The second surface of the generally planar surface may or may not have a frame. Furthermore, the method 400 may include disposing another layer of insulation or an exterior cladding to the insulation material provided on either side of the generally planar surface.

In some embodiments, a cover board, such as a wall board, roofing board, and/or ceiling panel, etc. may be applied over an exposed surface of the pour-in-place insulation layer. For example, after the pour-in-place insulation has been poured, a wall board, such as a gypsum board, OSB board, plywood board, etc. may be affixed to the structural component, such as by using one or more fasteners. In some embodiments, the cover board may be applied prior to the pour-in-place foam curing. In such embodiments, the tack of the foam may help adhere the cover board (and other components of the structural component) to the frame. In other embodiments, the cover board may be applied after the pour-in-place foam has cured. In some embodiments, additional finishing processes, such as painting, coating, and/or otherwise treating the cover board.

At optional operation 435, the method 400 may include storing the building component. For example, operation 435 may include storing the building component prior to installation. The component may be stored at a manufacturing facility and/or another location that is remotely located relative to an installation site of the building component. However, the building component may alternatively be manufactured in the field in a remote location from the installation site. That is, the pour-in-place insulation may be applied at a job site where the building component is manufactured, but that is remotely located from where the building component is to be installed. As used herein, remote may be understood to mean any distance from the installation site, such as a different location or area on site relative to where the component will be transferred to and installed, or may refer to a different facility or site altogether.

Embodiments of the present invention may allow for efficient and safe manufacture of building components. In conventional technologies, application of insulation materials may result in overspray, thus wasting material. Conventional technologies may also result in the formation of VOCs, requiring extensive venting and/or exhaust systems as well as the use of PPE. The systems and methods of the present invention may reduce or eliminate the need for venting and/or exhaust systems as well as the use of PPE. The systems and methods may also increase efficiency by reducing or eliminating the amount of waste of insulation materials. In embodiments, sensors may be provided to automate the manufacturing and further increase efficiency and throughput.

The methods, systems, and devices discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

What is claimed is:

1. A building component manufacturing method comprising:
    providing a structural component of a building, the structural component comprising:
        a frame comprising a plurality of outer components coupled together to define an outer periphery of one or more sections, wherein at least one of the sections comprises a cavity;
    applying a pour-in-place insulation material within the cavity to insulate the structural component, wherein the pour-in-place insulation material transitions from a liquid state to a solid state to form a first layer of insulation within the cavity;
    monitoring, using one or more sensors, a fill level of the pour-in-place insulation material within the cavity relative to a desired fill level while applying the pour-in-place insulation material; and
    controlling a flow rate of the pour-in-place insulation material based on the fill level within the cavity as determined by the one or more sensors, wherein controlling the flow rate comprises adjusting the flow rate of the pour-in-place insulation material at one or more locations to achieve the desired fill level based on the fill level within the cavity as determined by the one or more sensors and an expansion rate of the pour-in-place insulation material.

2. The building component manufacturing method of claim 1, wherein:
    the structural component further comprises a generally planar surface, the frame being positioned atop one side of the generally planar surface so that a lateral boundary of the cavity is defined by the at least one of the sections and a base of the cavity is defined by the generally planar surface.

3. The building component manufacturing method of claim 1, wherein applying the pour-in-place insulation material comprises:
    positioning one or more nozzles over the cavity; and
    injecting the pour-in-place insulation material within the cavity through the one or more nozzles.

4. The building component manufacturing method of claim 1, wherein:
    the pour-in-place insulation material is characterized by a viscosity of between about 250 centipoise and about 800 centipoise, wherein the viscosity is measured at a temperature of about 75 degrees Fahrenheit.

5. The building component manufacturing method of claim 1, wherein:
    the first layer of insulation is characterized by a density between about 0.3 pounds per square foot and about 10.0 pounds per cubic foot.

6. The building component manufacturing method of claim 1, wherein:
    the first layer of insulation is characterized by an insulation R value of greater than or about R−3 per inch of the first layer of insulation.

7. The building component manufacturing method of claim 1, wherein:
    monitoring the fill level within the cavity comprises detecting, using the one or more sensors, the fill level of the pour-in-place insulation material, a fill level of the first layer of insulation, or both within the cavity.

8. The building component manufacturing method of claim 1, further comprising:
    monitoring the fill level within the cavity comprises detecting that the fill level of the pour-in-place insulation material at the one or more locations of the cavity are below or above a desired fill level.

9. The building component manufacturing method of claim 1, further comprising:
    subsequent to the pour-in-place insulation material transitioning to the solid state and forming the first layer of insulation, detecting at least one location of the cavity that has an incomplete fill level; and
    applying an additional volume of the pour-in-place insulation material within the cavity to further fill the cavity.

10. The building component manufacturing method of claim 1, wherein:
the first layer of insulation is applied at a site where the building component is manufactured, wherein the site where the building component is manufactured is remote from a site where the building component is to be installed.

11. The building component manufacturing method of claim 1, wherein:
the expansion rate of the pour-in-place insulation material comprises one or both of a current expansion rate and an empirical expansion rate.

* * * * *